US009395610B2

(12) United States Patent
Suzuki et al.

(10) Patent No.: US 9,395,610 B2
(45) Date of Patent: Jul. 19, 2016

(54) LIGHT SOURCE, PROJECTOR, AND METHOD OF COOLING DISCHARGE LAMP

(71) Applicant: SEIKO EPSON CORPORATION, Tokyo (JP)

(72) Inventors: Junichi Suzuki, Chino (JP); Yasuhiro Toba, Matsumoto (JP); Tetsuo Terashima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 50 days.

(21) Appl. No.: 14/291,689

(22) Filed: May 30, 2014

(65) Prior Publication Data

US 2014/0375965 A1    Dec. 25, 2014

(30) Foreign Application Priority Data

Jun. 20, 2013 (JP) ................. 2013-129335
Mar. 28, 2014 (JP) ................. 2014-068224

(51) Int. Cl.
   *G03B 21/16*    (2006.01)
   *F21V 29/02*    (2006.01)
   *H01J 17/28*    (2006.01)
   *G03B 21/20*    (2006.01)

(52) U.S. Cl.
   CPC ............... *G03B 21/16* (2013.01); *F21V 29/02* (2013.01); *G03B 21/2026* (2013.01); *H01J 17/28* (2013.01)

(58) Field of Classification Search
   CPC ......... G03B 21/16; G03B 21/26; H01J 17/28; H05B 37/02; H05B 37/00; G02F 1/1333
   USPC ......................... 353/52, 54, 60, 61
   See application file for complete search history.

(56) References Cited

U.S. PATENT DOCUMENTS

| | | | | |
|---|---|---|---|---|
| 6,709,111 | B2 * | 3/2004 | Hirao ................. | H05K 7/20209 349/5 |
| 6,886,942 | B2 * | 5/2005 | Okada .................... | G03B 21/16 348/E9.027 |
| 7,484,852 | B2 * | 2/2009 | Kuraie .................. | G03B 21/16 348/748 |
| 7,537,348 | B2 * | 5/2009 | Horiguchi ............ | H04N 9/3144 353/52 |
| 7,606,640 | B2 * | 10/2009 | Hirai ...................... | G03B 21/16 349/5 |
| 8,134,107 | B2 * | 3/2012 | Okada .................... | G03B 21/14 250/205 |
| 9,022,573 | B2 * | 5/2015 | Shioya .................. | G03B 21/16 315/117 |
| 2006/0158125 | A1 | 7/2006 | Pollmann-Retsch et al. | |
| 2008/0218050 | A1 | 9/2008 | Soma et al. | |
| 2010/0201955 | A1 | 8/2010 | Jougo | |
| 2011/0234987 | A1 | 9/2011 | Tanaka et al. | |
| 2012/0002177 | A1 * | 1/2012 | Lin ..................... | G05D 23/1904 353/57 |

FOREIGN PATENT DOCUMENTS

| | | |
|---|---|---|
| JP | A-10-115873 | 5/1998 |
| JP | A-10-125287 | 5/1998 |
| JP | A-2003-322912 | 11/2003 |
| JP | A-2006-510174 | 3/2006 |

(Continued)

*Primary Examiner* — William C Dowling
(74) *Attorney, Agent, or Firm* — Oliff PLC

(57) ABSTRACT

A light source includes a discharge lamp that outputs light, a discharge lamp driver that supplies drive power to the discharge lamp, a cooling unit that cools the discharge lamp, and a control unit that controls the cooling unit, and the control unit controls the cooling unit based on control information representing a relationship a rotation speed of the cooling unit between at least one of temperature information of the discharge lamp and a voltage between electrodes of the discharge lamp.

17 Claims, 12 Drawing Sheets

(56) References Cited

FOREIGN PATENT DOCUMENTS

| JP | A-2007-328005 | 12/2007 |
| JP | A-2008-52931 | 3/2008 |
| JP | A-2008-250287 | 10/2008 |
| JP | A-2009-129622 | 6/2009 |
| JP | A-2009-198640 | 9/2009 |
| JP | A-2011-221482 | 11/2011 |
| WO | WO 2004/054328 A1 | 6/2004 |

* cited by examiner

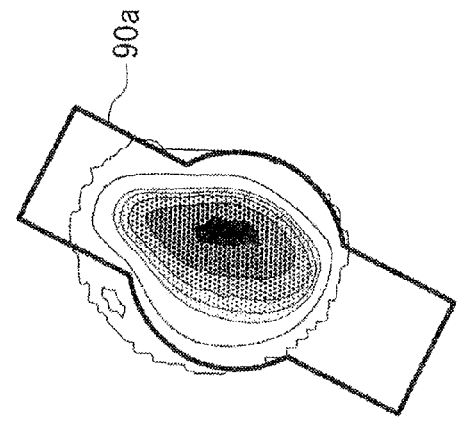
FIG.11C  VIa=78.6 [V]
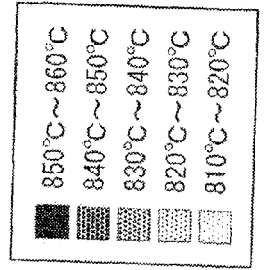
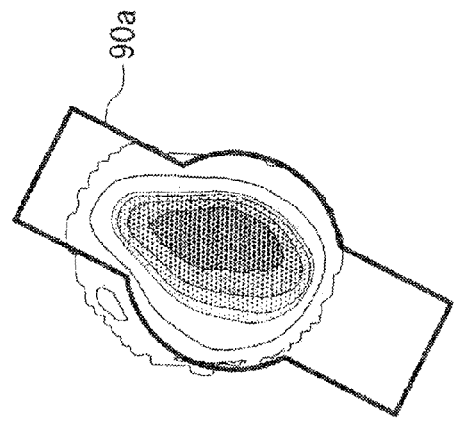
FIG.11B  VIa=74.3 [V]
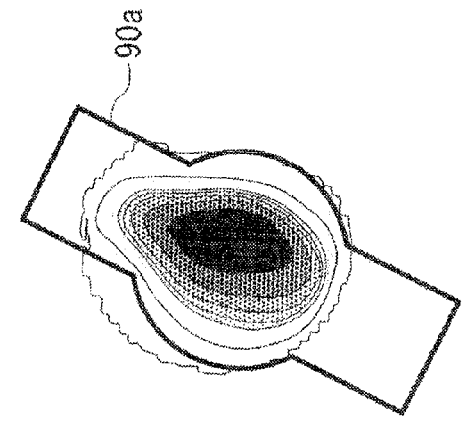
FIG.11E  VIa=91.2 [V]
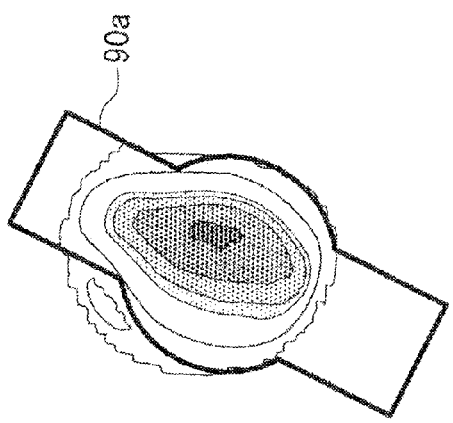
FIG.11A  VIa=65.7 [V]
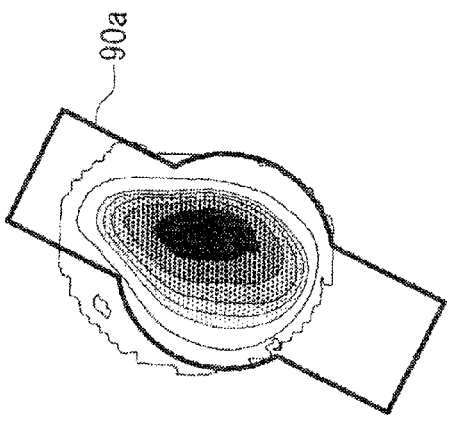
FIG.11D  VIa=88.5 [V]

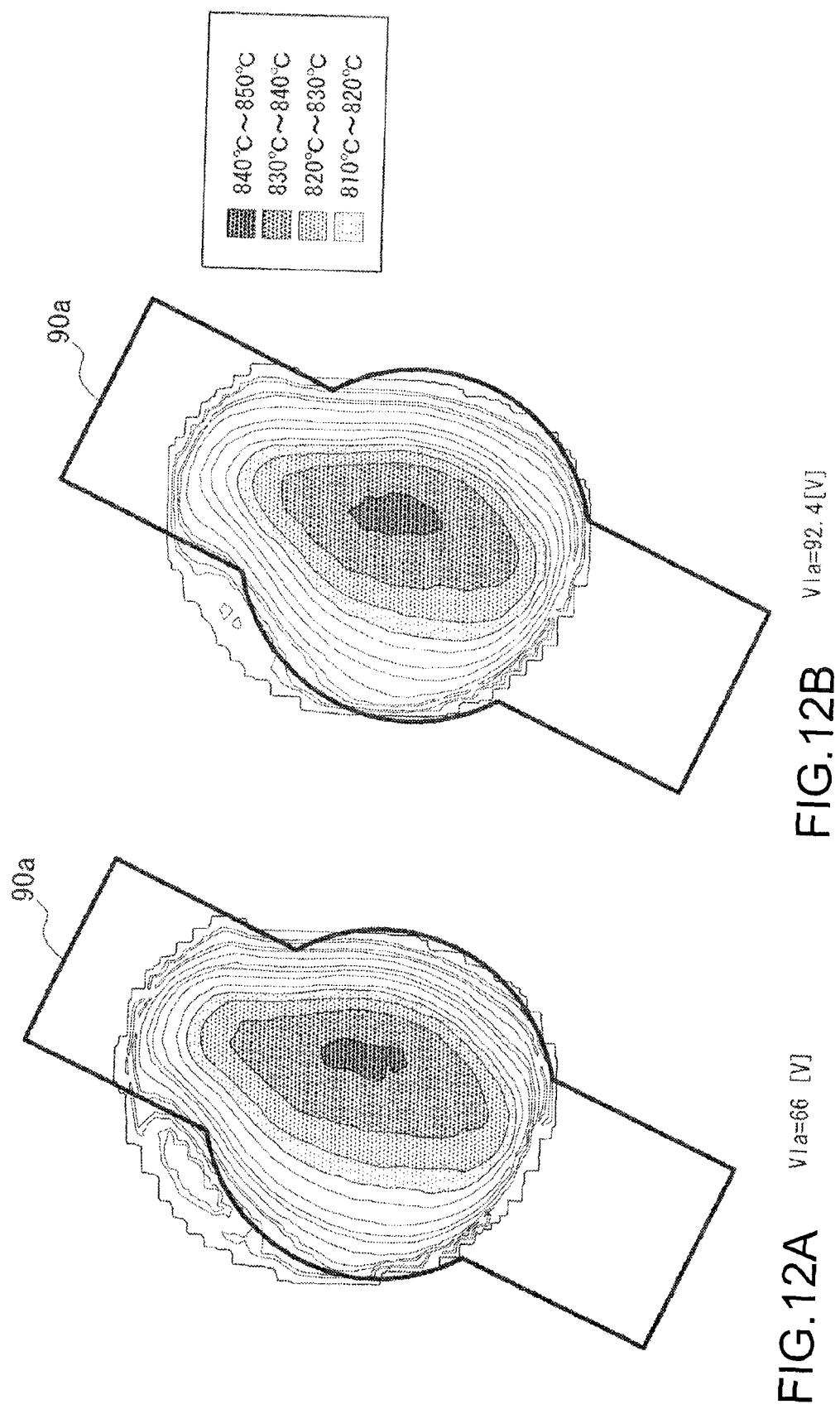

LIGHT SOURCE, PROJECTOR, AND METHOD OF COOLING DISCHARGE LAMP

BACKGROUND

1. Technical Field

The present invention relates to a light source, a projector, and a method of cooling a discharge lamp.

2. Related Art

In order to exploit the full performance of a discharge lamp including a high-pressure mercury lamp used for a projector or the like, it is necessary to keep the temperature of the coolest part of the discharge lamp, generally, the bottom part on the downside in the vertical direction of the discharge lamp higher.

On the other hand, if the temperature of the discharge lamp is too high, the inner wall of the arc tube of the discharge lamp is subjected to a high temperature and crystallized, and thereby, devitrification that transmittance becomes lower due to opacity may occur. Accordingly, it is necessary to suppress the temperature of the hottest part of the discharge lamp, generally, the top part on the upside in the vertical direction of the discharge lamp to a certain extent.

In this regard, a method of properly cooling the discharge lamp by improving a method of flowing a cooling fluid has been disclosed (for example, Patent Document 1 (JP-2011-221482)).

Usually, cooling of the discharge lamp is designed to provide a proper cooling condition under an initial lighting state. However, in response to the lighting time of the discharge lamp, the temperature of the discharge lamp changes due to changes in electrodes and plasma volume. Accordingly, there has been a problem that, with the cooling settings of the initial lighting, proper cooling of the discharge lamp can not be maintained and the life of the discharge lamp is made shorter.

SUMMARY

An advantage of some aspects of the invention is to provide a light source that may improve the life of the discharge lamp by changing cooling settings in response to changes in a discharge lamp over time and maintaining the discharge lamp in a proper cooling condition, and a projector using the light source. Another advantage of some aspects of the invention is to provide a method of cooling a discharge lamp that may improve the life of the discharge lamp by changing cooling settings in response to changes in the discharge lamp over time and maintaining the discharge lamp in a proper cooling condition.

A light source according to an aspect of the invention includes a discharge lamp that outputs light, a discharge lamp driver that supplies drive power to the discharge lamp, a cooling unit that cools the discharge lamp, and a control unit that controls the cooling unit, wherein the control unit controls the cooling unit based on control information representing a relationship between a rotation speed of the cooling unit and at least one of temperature information of the discharge lamp and a voltage between electrodes of the discharge lamp.

According to the configuration, the control unit controls the cooling unit based on the control information representing the relationship between at least one of the temperature information of the discharge lamp and the voltage between electrodes of the discharge lamp and the rotation speed of the cooling unit. Thereby, the rotation speed of the cooling unit may be obtained by detection of at least one of the temperature information of the discharge lamp and the discharge lamp voltage. Accordingly, for example, even when the discharge lamp voltage rises, the rotation speed of the cooling unit may be adjusted so that the temperature of the discharge lamp may be constant, i.e., a proper temperature that has been initially set. Therefore, settings of the cooling unit are changed in response to changes in discharge lamp over time, and thereby, the discharge lamp may be maintained in a proper cooling condition and the life of the discharge lamp may be improved.

Further, for example, the rotation speed of the cooling unit is a linear function with the voltage between electrodes of the discharge lamp as a variable.

The temperature information of the discharge lamp may include a temperature in a top part on an upside in a vertical direction of the discharge lamp.

According to this configuration, the cooling condition of the discharge lamp may be controlled so that the temperature in the top part (hottest part) of the discharge lamp may be a proper condition. That is, the highest temperature of the discharge lamp may be controlled.

The control unit may further control at least one of a blowing position and a blowing region of cooling wind from the cooling unit based on the control information.

According to this configuration, not only the control of the amount of air of the cooling wind by controlling the rotation speed of the cooling unit but also the control of one of an application position and an application region of the cooling wind blowing to the discharge lamp is performed, and thereby, the temperature distribution of the discharge lamp may be controlled in a proper condition in addition to the control of the temperature of the top part (hottest part) of the discharge lamp in the proper condition.

The rotation speed of the cooling unit may take a value determined with respect to a predetermined range of the voltage between electrodes of the discharge lamp.

According to this configuration, the rotation speed of the cooling unit may be controlled at multiple steps so as to be the value determined with respect to the predetermined range of the voltage between electrodes of the discharge lamp, and accordingly, the control of the cooling condition of the discharge lamp may be realized by having a simple control table.

The control unit may control the cooling unit based on the control information and information of the drive power.

According to this configuration, the discharge lamp may be maintained in the more proper cooling condition.

A projector according to another aspect of the invention includes the light source according to the aspect of the invention, a light modulation device that modulates the light output from the light source in response to a video signal, and a projection system that projects the light modulated by the light modulation device.

According to this configuration, the life of the discharge lamp may be improved and the projector with advantageous reliability may be obtained.

A method of cooling a discharge lamp according to still another aspect of the invention, is a method of cooling a discharge lamp using a cooling unit and includes controlling the cooling unit based on control information representing a relationship between a rotation speed of the cooling unit and at least one of temperature information of the discharge lamp and a voltage between electrodes of the discharge lamp.

According to the method, the control of the cooling unit is performed based on the control information representing the relationship between at least one of the temperature information of the discharge lamp and the voltage between electrodes of the discharge lamp and the rotation speed of the cooling unit. Accordingly, for example, even when the voltage between electrodes of the discharge lamp rises, the rotation speed of the cooling unit may be adjusted so that the temperature of the discharge lamp may be constant, i.e., a proper temperature that has been initially set. Therefore, cooling settings are changed in response to changes in discharge lamp over time, and thereby, the discharge lamp may be maintained in a proper cooling condition and the life of the discharge lamp may be improved.

BRIEF DESCRIPTION OF THE DRAWINGS

The invention will be described with reference to the accompanying drawings, wherein like numbers reference like elements.

FIGS. 11A to 11E show changes in temperature distribution of a discharge lamp of related art.

FIGS. 12A and 12B show changes in temperature distribution of a discharge lamp in the working examples of the first embodiment.

DESCRIPTION OF EXEMPLARY EMBODIMENTS

As below, a projector according to an embodiment of the invention will be explained with reference to the drawings.

Note that the scope of the invention is not limited to the following embodiments, but may be arbitrarily changed within the scope of the technical idea of the invention. Further, in the following drawings, scales, numerals, etc. in the actual structures and respective structures are different for clarification of the respective configurations.

First Embodiment

Figure 1:
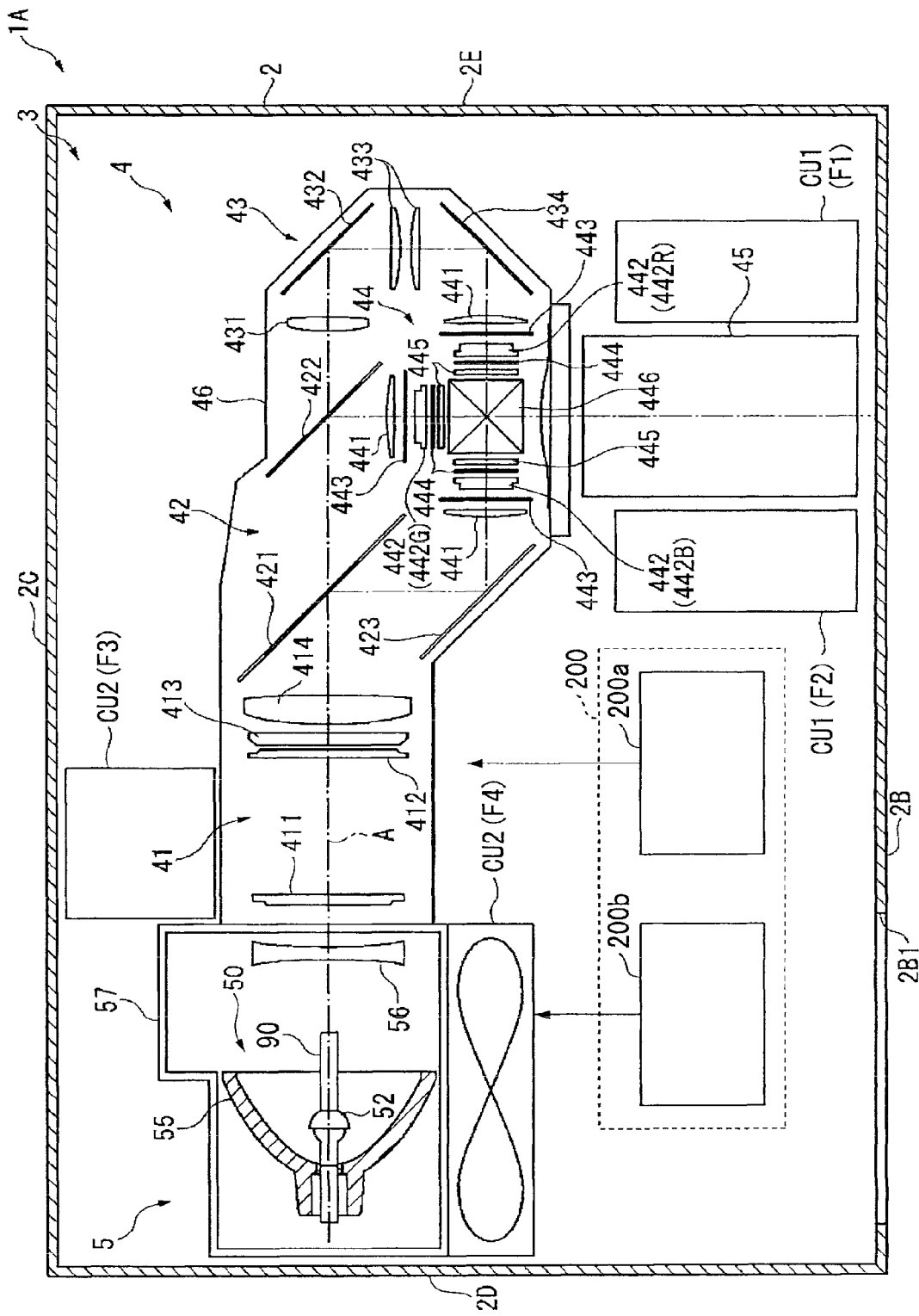
FIG. 1 is a schematic configuration diagram of a projector of the first embodiment.

FIG. 1 is a schematic configuration diagram of a projector 1A according to the embodiment.

As shown in FIG. 1, the projector 1A according to the embodiment modulates luminous flux output from a light source provided inside, forms image light in response to image information, and enlarges and projects the image light on a projected surface such as a screen. The projector 1A includes an exterior casing 2 forming an exterior, and an apparatus main body 3 housed in the exterior casing 2.

The exterior casing 2 is a box-shaped casing including a top surface (not shown), a front surface 2B, a rear surface 2C, a left side surface 2D, a right side surface 2E, and a bottom surface (not shown) in a nearly rectangular shape in a plan view. A plurality of leg parts (not shown) are provided on the bottom surface of the exterior casing 2.

The projector 1A is placed with the leg parts in contact with a mounting surface in a normal position, and vertically reversed to the normal position and attached with the bottom surface directed toward the ceiling or the like in an inverted position.

The apparatus main body 3 includes an optical controller 200a, a first cooling unit CU1, and an optical unit 4. Further, though not illustrated, the apparatus main body 3 includes a power supply unit that supplies drive power to the respective component members of the projector 1A etc.

The optical controller 200a controls the first cooling unit CU1 and the optical unit 4.

The first cooling unit CU1 includes a fan F1 and a fan F2 and introduces cooling air as a cooling fluid from outside of the exterior casing 2 and blows the cooling air to the optical unit 4, the optical controller 200a, and the power supply unit, and thereby, cools the respective units. The fans F1, F2 are placed to sandwich a projection optical device 45. The fans F1, F2 include sirocco fans, and introduce the outside cooling air from an intake port (not shown) formed in the exterior casing 2 and blow the cooling air to an electrooptical unit 44, which will be described later.

The optical unit 4 forms image light in response to image information and projects the image light on a screen or the like under the control of the optical controller 200a. The optical unit 4 includes a light source 5, an illumination optical device 41, a color separation optical device 42, a relay optical device 43, the electrooptical device 44, the projection optical device (projection system) 45, and a casing for optical components 46.

The casing for optical components 46 houses the respective devices of the optical unit 4 in predetermined positions on an illumination optical axis A set inside and supports the projection optical device 45.

The light source 5 outputs luminous flux. The light source 5 includes a second cooling unit (cooling unit) CU2, a light source unit 50, a parallelizing concave lens 56, a housing 57, and a fan controller (control unit) 200b.

The second cooling unit CU2 includes a fan F3 and a fan F4.

The fans F3, F4 are provided near the light source unit 50. The fan F3 located at the rear surface 2C side of the projector 1A includes a sirocco fan, and suctions the cooling air within the exterior casing 2 and blows the air to the light source unit 50.

Further, the fan F4 located at the front surface 2B side of the projector 1A includes an axial fan. The fan F4 suctions the air that has cooled the light source unit 50 and exhausts the air toward the front surface 2B side of the projector 1A, and exhausts the air to the outside of the exterior casing 2 via an exhaust port 2B1 of the front surface 2B.

Note that the fan F3 may be an axial fan and the fan F4 may be a sirocco fan. Further, the exhaust port 2B1 may be formed in any surface of the exterior casing 2.

Figure 2:
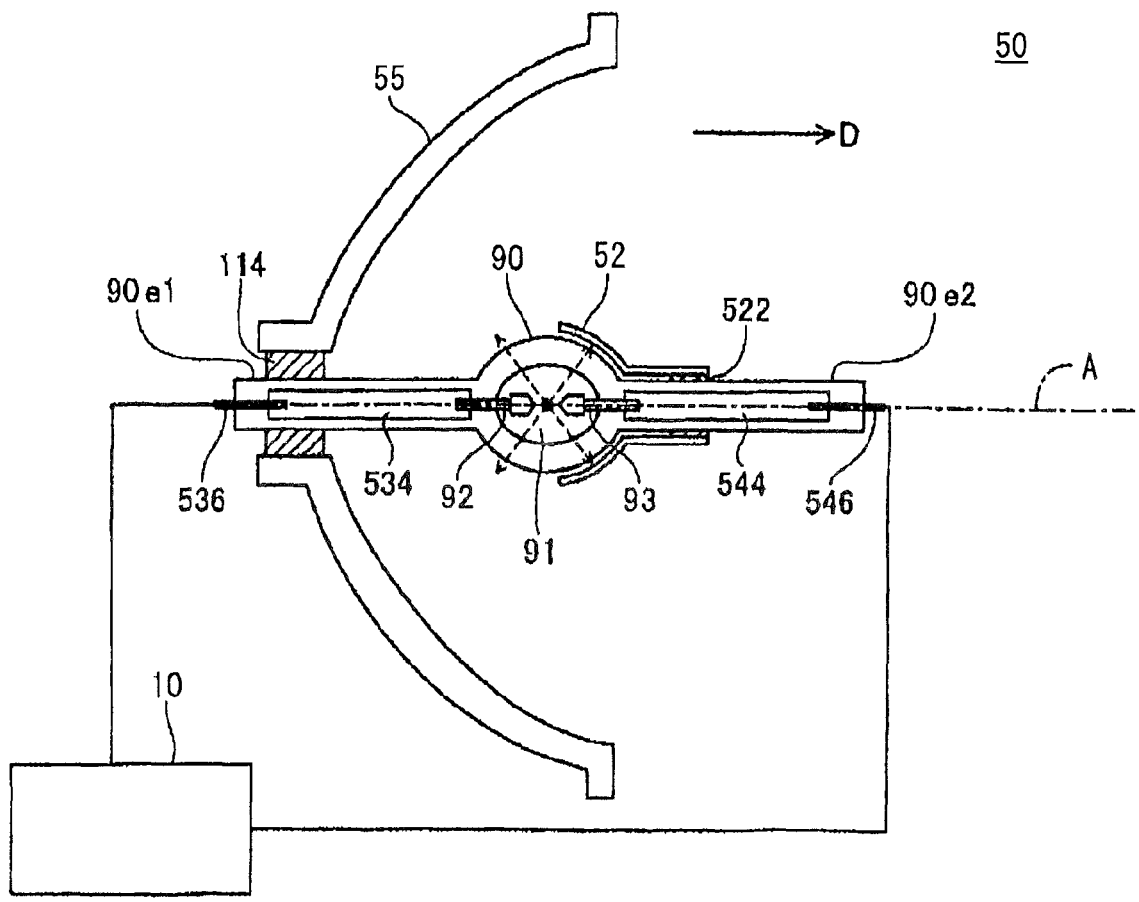
FIG. 2 is a sectional view of a discharge lamp of the first embodiment.

FIG. 2 is a sectional view showing a configuration of the light source unit 50. As shown in FIG. 2, the light source unit 50 includes a main reflector 55, a discharge lamp 90, a sub-reflector 52, and a discharge lamp lighter (discharge lamp driver) 10.

The main reflector 55 reflects the light emitted from the discharge lamp 90 toward an irradiation direction D. The irradiation direction D is in parallel to the illumination optical axis A of the discharge lamp 90.

The shape of the discharge lamp 90 is a rod-like shape extending along the irradiation direction D. One end of the discharge lamp 90 is referred to as "first end 90e1" and the other end of the discharge lamp 90 is referred to as "second end 90e2". The material of the discharge lamp 90 is a light-transmissive material including quartz glass, for example. The center part of the discharge lamp 90 bulges in a spherical shape, and the inside thereof is a discharge space 91. A gas as a discharge medium including rare gas and a metal halogen compound, etc. is enclosed in the discharge space 91.

In the discharge space 91, ends of a first electrode 92 and a second electrode 93 project. The first electrode 92 is provided at the first end 90e1 side of the discharge space 91. The second electrode 93 is provided at the second end 90e2 side of the discharge lamp 90. The shapes of the first electrode 92 and the second electrode 93 are rod shapes extending along the illumination optical axis A. In the discharge space 91, the electrode ends of the first electrode 92 and the second electrode 93 are provided to be opposed apart at a predetermined distance. The material of the first electrode 92 and the second electrode 93 is a metal including tungsten, for example.

A first terminal 536 is provided on the first end 90e1 of the discharge lamp 90. The first terminal 536 and the first electrode 92 are electrically connected by a conducting member 534 penetrating inside of the discharge lamp 90. Similarly, a second terminal 546 is provided on the second end 90e2 of the discharge lamp 90. The second terminal 546 and the second electrode 93 are electrically connected by a conducting member 544 penetrating inside of the discharge lamp 90. The material of the first terminal 536 and the second terminal 546 is a metal including tungsten, for example. As the material of the conducting members 534, 544, for example, a molybdenum foil is used.

The first terminal 536 and the second terminal 546 are connected to the discharge lamp lighter 10. The discharge lamp lighter 10 supplies a drive current for driving the discharge lamp 90 to the first terminal 536 and the second terminal 546. In other words, the discharge lamp lighter 10 applies drive power between the first electrode 92 and the second electrode 93 of the discharge lamp 90. As a result, arc discharge occurs between the first electrode 92 and the second electrode 93. The lights generated by the arc discharge (discharge light) radiate from the discharge position in all directions as shown by dashed arrows. The discharge lamp lighter 10 is controlled by the optical controller 200a.

Figure 3:
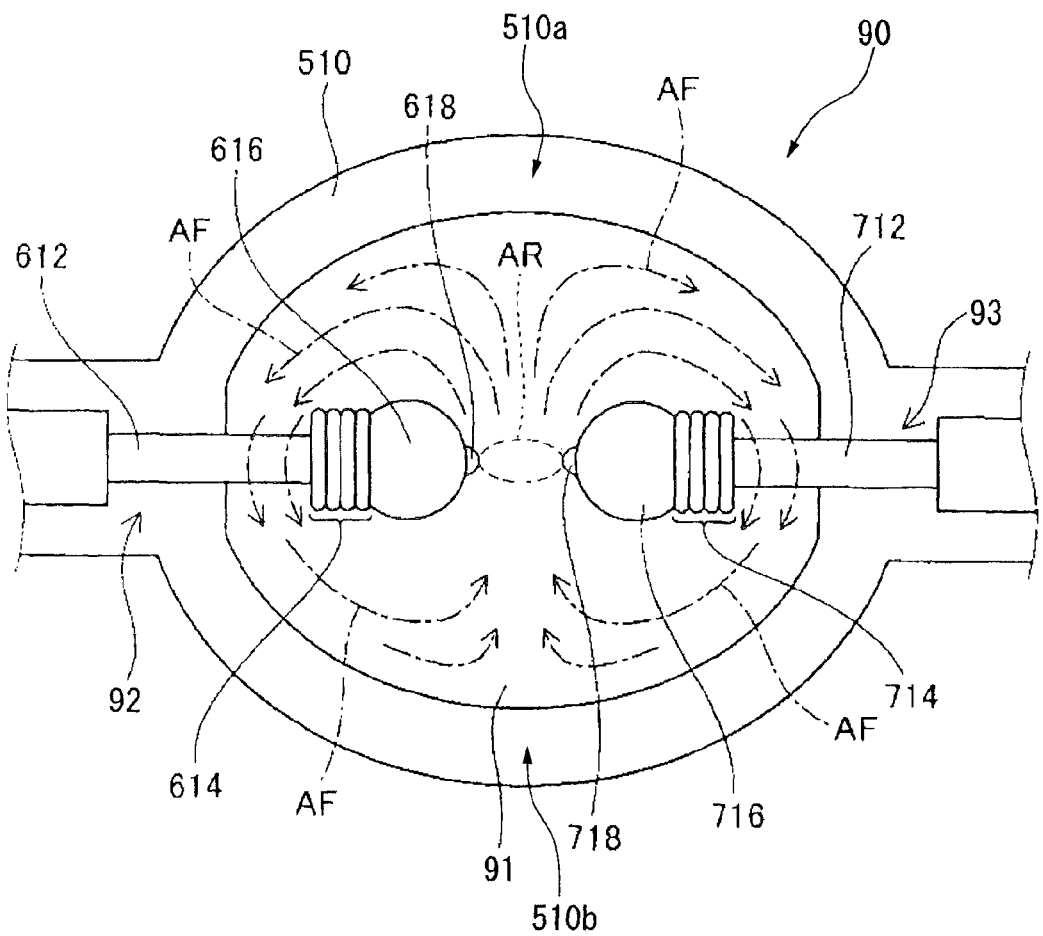
FIG. 3 is a partially enlarged sectional view of the discharge lamp of the first embodiment.

FIG. 3 is a partially enlarged sectional view of the discharge lamp 90.

As shown in FIG. 3, the first electrode 92 includes a core rod 612, a coil part 614, a main body part 616, and a projection 618. The first electrode 92 is formed at the stage prior to sealing in a discharge lamp main body 510 by forming the coil part 614 by winding a wire of an electrode material (tungsten or the like) around the core rod 612 and heating and melting the formed coil part 614. Thereby, at the tip end side of the first electrode 92, the main body part 616 having large heat capacity and the projection 618 as a position of generation of arc AR are formed.

The second electrode 93 includes a core rod 712, a coil part 714, a main body part 716, and a projection 718. The second electrode 93 is formed in the same manner as the first electrode 92.

When the discharge lamp 90 is lighted, the gas sealed within the discharge space 91 is heated by the generation of the arc AR and convectively flows within the discharge space 91. Specifically, the temperature of the arc AR and the region around the arc becomes extremely higher, and the convection AF (shown by dashed-dotted arrows in FIG. 3) flowing from the arc AR upward in the vertical direction is formed within the discharge space 91. As shown in FIG. 3, the convection AF collides with the inner wall of the discharge lamp main body 510 and moves along the inner wall of the discharge lamp main body 510, and falls while being cooled by passing through the core rods 612, 712 of the first electrode 92 and the second electrode 93 etc.

The convection AF that has fallen further falls along the inner wall of the discharge lamp main body 510, and collides with each other at the downside in the vertical direction of the arc AR and rises to be returned to the arc AR above.

The convection AF moves along the inner wall of the discharge lamp main body 510, and thereby, the discharge lamp main body 510 is heated. Here, the temperature of the convection AF is the highest at the upside in the vertical direction of the arc AR and the lowest at the downside in the vertical direction of the arc AR. Accordingly, a top part 510a of the discharge lamp main body 510 in contact with the convection AF at the upside in the vertical direction of the arc AR is the hottest part in which the temperature is the highest in the discharge lamp main body 510 (discharge lamp 90). Further, a bottom part 510b of the discharge lamp main body 510 in contact with the convection AF at the downside in the vertical direction of the arc AR is the coolest part in which the temperature is the lowest in the discharge lamp main body 510 (discharge lamp 90).

As shown in FIG. 2, the main reflector 55 is fixed to the first end 90e1 of the discharge lamp 90 by a fixing member 114. The main reflector 55 reflects the light traveling toward the opposite side to the irradiation direction D of the discharge lights in the irradiation direction D. The shape of the reflection surface (the surface at the discharge lamp 90 side) of the main reflector 55 is not particularly limited within such a range that the discharge lights may be reflected in the irradiation direction D, but may be a spheroidal shape or paraboloidal shape, for example. For example, in the case where the shape of the reflection surface of the main reflector 55 is the paraboloidal shape, the main reflector 55 may convert the discharge light into light nearly in parallel to the illumination optical axis A. Thereby, the parallelizing concave lens 56 is dispensable.

The sub-reflector 52 is fixed to the second end 90e2 side of the discharge lamp 90 by a fixing member 522. The shape of the reflection surface (the surface at the discharge lamp side) of the sub-reflector 52 is a spherical shape surrounding the part of the discharge space 91 at the second end 90e2 side. The sub-reflector 52 reflects the light traveling toward the opposite side to the side at which the main reflector 55 is provided toward the main reflector 55. Thereby, the use efficiency of the lights radiated from the discharge space 91 may be improved.

The material of the fixing members 114, 522 is not particularly limited in a range as a heat-resistant material that can resist heat generated from the discharge lamp 90, but may be an inorganic adhesive, for example. As the method of fixing the arrangement of the main reflector 55, the sub-reflector 52, and the discharge lamp 90, not limited to the method of fixing the main reflector 55 and the sub-reflector 52 to the discharge lamp 90, but any method may be employed. For example, the discharge lamp 90 and the main reflector 55 may be independently fixed to the housing 57. The same applies to the sub-reflector 52.

As shown in FIG. 1, the housing 57 houses the light source unit 50 and the parallelizing concave lens 56.

The parallelizing concave lens 56 parallelizes the luminous flux converged by the main reflector 55 with respect to the illumination optical axis A.

The fan controller 200b controls the second cooling unit CU2, i.e., the fans F3, F4. In the embodiment, a method of controlling the cooling condition of the discharge lamp 90 by mainly controlling the fan F3 in the second cooling unit CU2 will be explained. Further, in the embodiment, as a method of controlling the fan F3, a method of changing the rotation speed (flow rate of cooling wind) of the fan F3 by controlling a fan voltage Vf applied for driving the fan F3 is used. According to the method, the fan voltage Vf is nearly proportional to the rotation speed of the fan F3, and thereby, control of the rotation speed of the fan F3 is easy.

To the fan controller 200b, control information CI representing a relationship between a lamp voltage Vla (voltage between electrodes) applied between the first electrode 92 and the second electrode 93 by the discharge lamp lighter 10 and the fan voltage Vf, i.e., the rotation speed of the fan F3 of the second cooling unit CU2 is input. The control information CI is stored in a memory unit (not shown), for example.

The fan controller 200b controls the fan F3 based on the control information CI. Information of the lamp voltage Vla is input to the fan controller 200b. The fan controller 200b applies the fan voltage Vf in response to the input lamp voltage Vla to the fan F3 using the control information CI. Thereby, the fan controller 200b controls the rotation speed of the fan F3. The method of detecting the lamp voltage Vla is not particularly limited, but any known method may be used. The lamp voltage Vla is detected by the discharge lamp lighter 10, for example.

In the embodiment, the optical controller 200a and the fan controller 200b form a control unit 200.

The control information CI input to the fan controller 200b may be experimentally obtained by measuring relationships between the lamp voltage Vla and a discharge lamp temperature T with respect to each fan voltage Vf.

Figure 4:
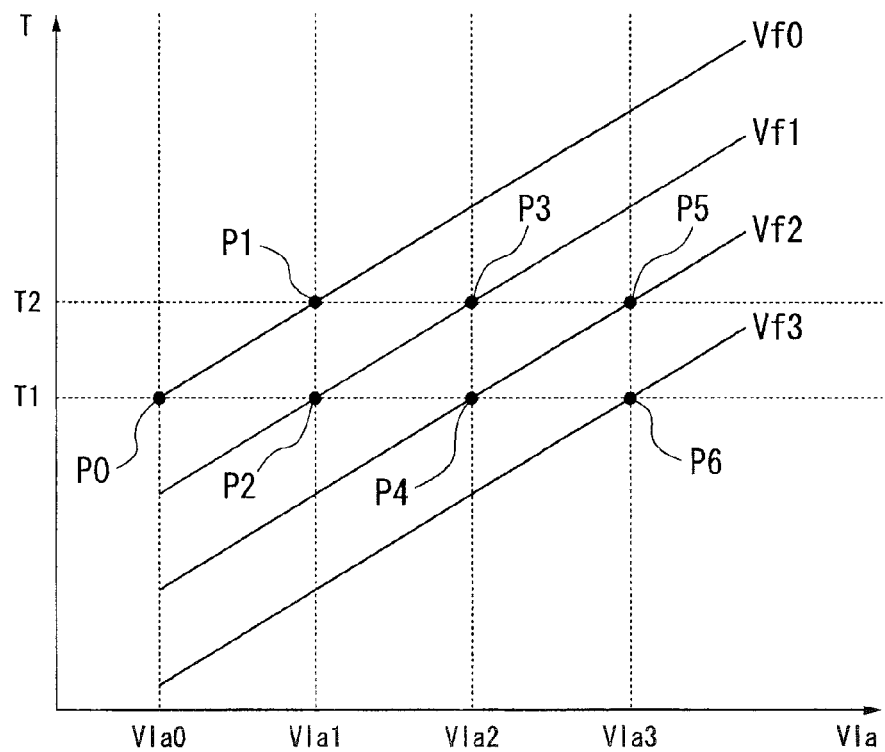
FIG. 4 is a graph showing relationships among a discharge lamp temperature, a lamp voltage, and a fan voltage in the first embodiment.

FIG. 4 is a graph showing examples of relationships between the lamp voltage Vla and the discharge lamp temperature T. The horizontal axis indicates the lamp voltage Vla and the vertical axis indicates the temperature of the top part 510a of the discharge lamp main body 510 (discharge lamp temperature) T. The relationships between the discharge lamp temperature T and the lamp voltage Vla when the value of the fan voltage Vf is varied are respectively shown.

As shown in FIG. 4, the relationships between the discharge lamp temperature T and the lamp voltage Vla are expressed by linear functions. That is, if the lamp voltage Vla rises due to some cause, the discharge lamp temperature T rises along a linear line. The fact that the relationships between the discharge lamp temperature T and the lamp voltage Vla are expressed by the linear functions has been newly revealed from the study of the inventors, and the gradients and the intercepts of the linear functions may be experimentally obtained with respect to each discharge lamp.

The details of the principle that the discharge lamp temperature T rises due to rise of the lamp voltage Vla are unknown, however, considered as follows.

When the distance between electrodes is larger due to the electrode wear over time, the lamp voltage Vla rises, and accordingly, the energy of plasma generated between the electrodes increases and the volume of the plasma becomes larger. It is considered that the discharge lamp temperature T rises as a result.

From the relationships between the lamp voltage Vla and the discharge lamp temperature T with respect to each fan voltage Vf shown in FIG. 4, the control information CI representing relationships between the lamp voltage Vla and the fan voltage Vf is obtained.

Figure 5:
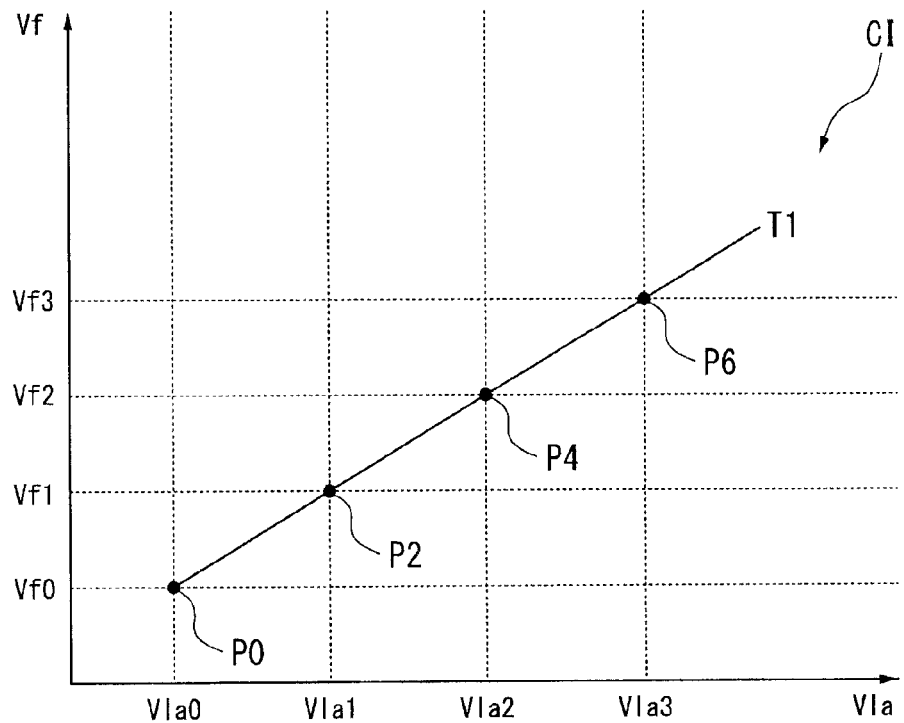
FIG. 5 is a graph showing an example of control information of the first embodiment.

FIG. 5 is a graph showing an example of the control information CI. FIG. 5 shows a relationship between the fan voltage Vf and the lamp voltage Vla when the discharge lamp temperature T is T1 (proper temperature).

As shown in FIG. 5, the relationship between the fan voltage Vf and the lamp voltage Vla is expressed by a linear function. In other words, the fan voltage Vf is a linear function with the lamp voltage Vla as a variable. Here, the fan voltage Vf is nearly proportional to the rotation speed of the fan F3, and thus, the rotation speed of the fan F3 is a linear function with the lamp voltage Vla as a variable.

The illumination optical device 41 includes a pair of lens arrays 411, 412, a polarization conversion element 413, and a superimposing lens 414.

The color separation optical device 42 includes dichroic mirrors 421, 422, and a reflection mirror 423.

The relay optical device 43 includes an incident-side lens 431, relay lenses 433, and reflection mirrors 432, 434.

The electrooptical device 44 includes field lenses 441, liquid crystal panels (light modulation devices) 442 as light modulators, light incident-side polarizers 443, viewing angle compensation plates 444, light exiting-side polarizers 445, and a cross dichroic prism 446 as a color combining optical device.

The liquid crystal panels 442 include a liquid crystal panel for red light 442R, a liquid crystal panel for green light 442G, and a liquid crystal panel for blue light 442B. The field lenses 441, the light incident-side polarizers 443, the viewing angle compensation plates 444, and the light exiting-side polarizers 445 are respectively provided with respect to each of the liquid crystal panels 442R, 442G, 442B.

The projection optical device 45 enlarges and projects the luminous flux modulated in the electrooptical device 44. Though not illustrated, the projection optical device 45 is formed as an assembled lens in which a plurality of lenses are housed within a cylindrical lens barrel.

The illuminance of the luminous flux output from the light source 5 is nearly uniformized within the illumination region by the illumination optical device 41, and the luminous flux is separated in to three color lights of red (R), green (G), and blue (B) by the color separation optical device 42. The separated respective color lights are respectively modulated in response to the image information in the respective liquid crystal panels 442. Then, the modulated respective color lights are combined in the cross dichroic prism 446, and enlarged and projected on a projection surface (for example, a screen or the like) by the projection optical device 45.

As below, the control of the fan F3 by the fan controller 200b based on the control information CI will be explained using FIGS. 4 and 5.

The output (rotation speed) of the fan F3 is set so that the discharge lamp 90 may be in the proper cooling condition in the initial state. That is, as shown in FIG. 4, in the initial state in which the value of the lamp voltage Vla is Vla0, the value of the fan voltage Vf is set to Vf0 (initial state P0) so that the discharge lamp temperature T may be the proper temperature T1 in the proper cooling condition.

The first electrode 92 and the second electrode 93 of the discharge lamp 90 are worn due to arc discharge, and thus, the distance between electrodes of the discharge lamp 90 becomes larger over time. As a result, the lamp voltage Vla rises.

When the lamp voltage Vla rises, the discharge lamp temperature T rises according to the linear line when the value of the fan voltage Vf is Vf0. For example, when the lamp voltage Vla rises to Vial, the value of the discharge lamp temperature T becomes T2 (state P1).

When the rise of the value of the lamp voltage Vla to Vla1 is detected, the fan controller 200b controls the fan F3 based on the control information CI as shown in FIG. 5. That is, in the state in which the value of the lamp voltage Vla is Vla1, the value of the fan voltage Vf is raised so that the discharge lamp temperature T may be the proper temperature T1. Specifically, as shown in FIGS. 4 and 5, the fan voltage Vf is raised to Vf1, and thereby, the discharge lamp temperature T may be lowered and the discharge lamp temperature T may be the proper temperature T1 (state P2).

Then, when the distance between electrodes of the discharge lamp 90 is even larger over time and the value of the lamp voltage Vla rises to Vla2, the value of the discharge lamp temperature T rises to T2 again (state P3). The fan controller 200b controls the fan F3 in the same manner as described above, and raises the value of the fan voltage Vf to Vf2. Thereby, the discharge lamp temperature T is returned to the proper temperature T1 (state P4). Similarly, when the lamp voltage Vla becomes Vla3 and the discharge lamp temperature T becomes T2 (state P5), the fan F3 is controlled based on the control information CI and the discharge lamp temperature T becomes the proper temperature T1 (state P6).

Subsequently, the fan F3 is controlled by the fan controller 200b in the same manner, and thereby, the discharge lamp temperature T may be maintained to be the proper temperature T1 in the proper cooling condition.

According to the embodiment, the fan controller 200b controls the fan F3 based on the control information CI. The control information CI represents the relationship between the lamp voltage Vla and the fan voltage Vf, and thereby, even when the lamp voltage Vla of the discharge lamp 90 rises over time, for example, the fan voltage Vf of the fan F3 may be adjusted so that the discharge lamp temperature T may be equal to or less than a fixed value, i.e., within a proper temperature range that has been initially set. Therefore, the discharge lamp may be maintained in the proper cooling condition, and the life of the discharge lamp may be improved.

Further, the control information CI represents the relationship between the lamp voltage Vla and the fan voltage Vf, and, according to the embodiment, the fan voltage Vf may be appropriately controlled by detection of the lamp voltage Vla. Therefore, the time and effort to detect the temperature using a temperature sensor or the like may be saved and the control may be simple and easy. Further, the temperature sensor or the like is not necessary, and complication of the whole apparatus may be suppressed.

Note that, in the embodiment, the following configurations and methods may be employed.

The above described configuration is to change the control of the fan voltage Vf with respect to the lamp voltage Vla in a stepwise manner, however, a configuration to constantly change the control according to changes in lamp voltage Vla based on the primary function (control information CI) shown in FIG. 5 may be employed. According to the configuration, the lamp temperature may be kept constant.

The control information CI may include information representing a relationship between the fan voltage Vf and a difference between the temperature of the top part 510a of the discharge lamp 90 and the temperature of the bottom part 510b of the discharge lamp 90 (temperature information of the discharge lamp), information representing a relationship between a temperature distribution of the discharge lamp 90 and the fan voltage Vf, and information representing a relationship between the temperature of the top part 510a of the discharge lamp 90 and the fan voltage Vf. In this case, though sensors for measurement of the temperature of the top part 510a of the discharge lamp 90 and the temperature of the bottom part 510b of the discharge lamp 90 are necessary, the control information CI may contain the difference between the temperature of the top part 510a and the temperature of the bottom part 510b of the discharge lamp 90 not correlated with the lamp voltage Vla etc.

An adjuster that may adjust the blow of the air (cooling wind) to the light source unit 50 (mainly, the discharge lamp 90) may be provided in the fan F3. As the adjuster, for example, a throttle that enables adjustment of the degree of opening of the air exhaust port of the fan F3 may be selected. According to the configuration, the blow of the air to the discharge lamp 90 is adjusted in response to the temperature distribution of the discharge lamp 90, and thereby, the temperature distribution of the discharge lamp 90 may be maintained in the initial state. As below, the details will be explained.

Generally, as a cause of shortening the life of the discharge lamp, blackening that an electrode material evaporated by arc discharge attaches to the inner wall of the arc tube of the discharge lamp is known. It is known that the blackening may be suppressed by a halogen cycle.

The halogen cycle is a reaction cycle of haloganating the electrode material by reaction of the melted and evaporated electrode material and a halogen gas enclosed within the discharge lamp, and returning the evaporated electrode material to the electrode again by convection within the discharge lamp. The melting point of the halogenated electrode material drops and coagulation on the inner wall of the arc tube is suppressed, and blackening is suppressed as a result.

When the discharge lamp is cooled using the fan, in the method of blowing the air to the whole discharge lamp, when proper cooling of the hottest part is intended, the part surrounding the hottest part may be cooled more than necessary. That is, the temperature of the part surrounding the hottest part may be lower than the proper temperature. In this case, the halogen cycle may be harder to be generated and blackening may occur on the inner wall of the discharge lamp surrounding the hottest part. The temperature of the blackened part becomes higher and devitrification may occur.

On the other hand, when the above described adjuster is used and the blow of the cooled air is concentrated on the hottest part (top part 510a) of the discharge lamp 90, for example, the reduction of the temperature in the part surrounding the top part 510a more than necessary may be suppressed while the temperature of the top part 510a as the hottest part may be properly maintained. As a result, the temperature distribution of the discharge lamp 90 may be maintained in the initial state as the proper cooling condition, and the life of the discharge lamp may be further improved.

Further, when the adjuster is provided, the control information CI may include information representing a relationship among information on the temperature distribution of the discharge lamp 90, the fan voltage Vf, and information on the adjuster (for example, the degree of opening of the throttle or the like). Thereby, the fan controller 200b may control at least one of a blowing position and a blowing region of the cooling wind from the fan F3 based on the control information CI.

Furthermore, in the embodiment, as the method of controlling the fan F3, the rotation speed of the fan F3, i.e., the flow rate of the cooling wind is changed by the control of the fan voltage Vf of the fan F3, however, not limited to that. For example, the fan voltage Vf may be set to a constant voltage and PWM (Pulse Width Modulation) control may be performed, and thereby, the rotation speed of the fan F3 may be changed. The PWM control is a method of controlling output of an object to be controlled by switching on/off of the applied constant voltage to input pulse wave to the object and change the period, width, or duty ratio of the pulse wave. In this case, a relationship between the period, width, or duty ratio of the pulse wave input to the fan F3 and the lamp voltage Vla is used as the control information CI, and thereby, the rotation speed of the fan F3 may be appropriately controlled and the temperature of the discharge lamp 90 may be maintained in the proper range.

In addition, in the embodiment, the method of controlling the cooling condition of the discharge lamp 90 by the control of the fan F3 has been explained, however, a method of controlling the fan F4 in conjunction with the fan F3 may be employed.

Second Embodiment

The second embodiment is different from the first embodiment in that the fan controller 200b controls the fan F3 based on control information and drive power supplied to the discharge lamp 90.

Note that, in the following explanation, the same configurations as those of the first embodiment have the same signs accordingly and their explanation may be omitted.

The gradient of the linear function of the control information representing the relationship between the lamp voltage Vla and the fan voltage Vf varies depending on the drive power (lamp power Wla) applied between the electrodes. The fact that the gradient of the control information varies depending on the lamp power Wla has been newly revealed from the study of the inventors. The gradient of the linear function with respect to each lamp power Wla, i.e., the control information may be experimentally obtained from the relationships between the lamp voltage Vla and the discharge lamp temperature T with respect to each fan voltage Vf like in the first embodiment.

Figure 6:
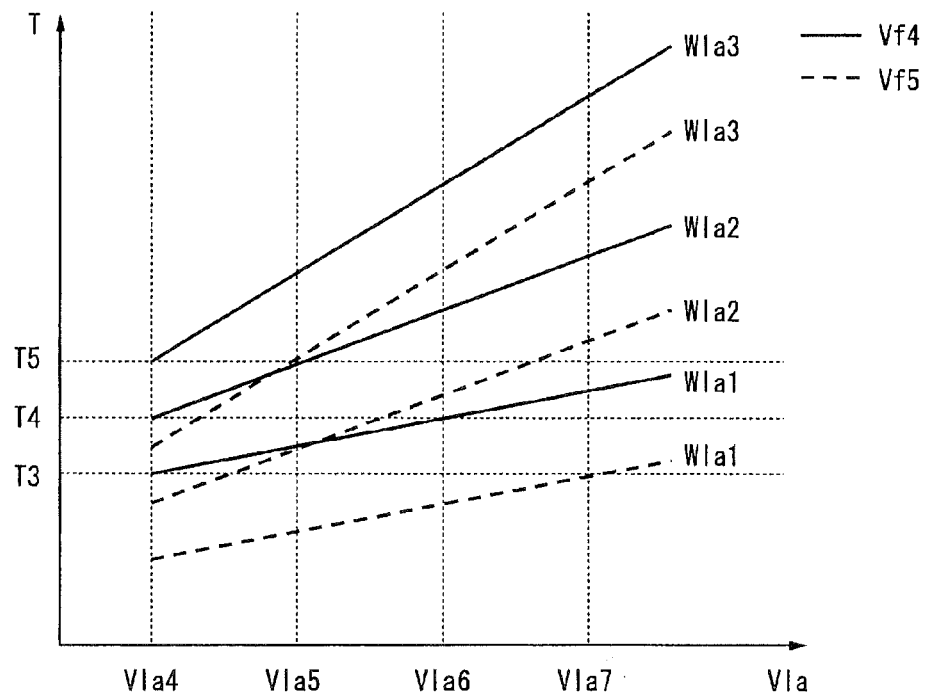
FIG. 6 is a graph showing relationships among a discharge lamp temperature, a lamp voltage, a fan voltage and a lamp voltage in the second embodiment.

FIG. 6 is a graph showing relationships between the lamp voltage Vla and the discharge lamp temperature T when the value of the fan voltage Vf and the value of the 1 am power Wla are changed. In FIG. 6, the horizontal axis indicates the lamp voltage Vla and the vertical axis indicates the discharge lamp temperature T of the top part 510a of the discharge lamp main body 510. In FIG. 6, the cases where the lamp power Wla is set to Wla1, Wla2, Wla3 are shown. The lamp powers Wla1, Wla2, Wla3 are larger in this order.

As shown in FIG. 6, the gradient of the linear function in the lamp power Wla2 is larger than the gradient of the linear function in the lamp power Wla1. The gradient of the linear function in the lamp power Wla3 is larger than the gradient of the linear function in the lamp power Wla2. That is, as the lamp power Wla is larger, the gradient of the linear function expressing the relationship between the discharge lamp temperature T and the lamp voltage Vla is larger. It is considered that, this is because, as the lamp power Wla is higher, the energy of the plasma generated between the electrodes increases and the discharge lamp temperature T is likely to rise.

Further, as the lamp power Wla is higher, the discharge lamp temperature T is higher. That is, for example, when the lamp voltage Vla is Vla4, as the lamp power Wla becomes higher to Wla1, Wla2, Wla3, the discharge lamp temperature T becomes higher to T3, T4, T5. This is because, when the lamp voltage Vla is fixed, as the lamp power Wla is higher, the current value flowing between the electrodes is larger and the thermal load on the discharge lamp 90 is larger.

Control information CIa with respect to each lamp power Wla may be obtained from the relationship between the lamp voltage Vla and the discharge lamp temperature T with respect to each lamp power Wla shown in FIG. 6.

Figure 7:
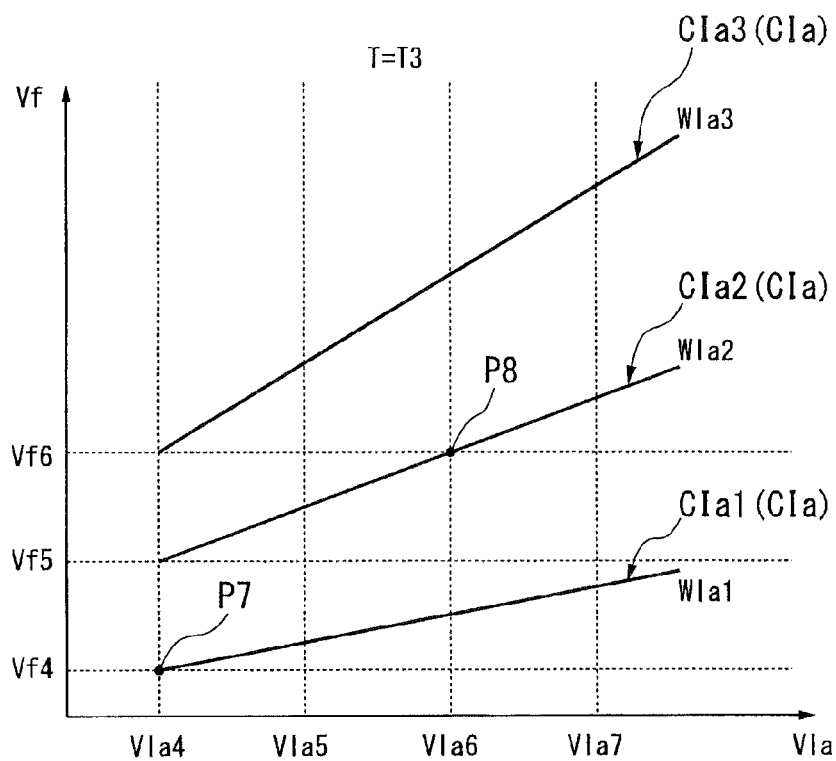
FIG. 7 is a graph showing an example of control information of the second embodiment.

FIG. 7 is a graph showing an example of the control information CIa in the embodiment. FIG. 7 shows a relationship between the fan voltage Vf and the lamp voltage Vla with respect to each lamp power Wla when the discharge lamp temperature T is T3 (proper temperature). In FIG. 7, the horizontal axis indicates the lamp voltage Vla and the vertical axis indicates the fan voltage Vf.

As shown in FIG. 7, the control information CIa of the embodiment includes control information CIa1, control information CIa2, and control information CIa3.

The control information CIa1 is control information when the lamp power Wla is Wla1. The control information CIa2 is control information when the lamp power Wla is Wla2. The control information CIa3 is control information when the lamp power Wla is Wla3. As shown in FIG. 6, as the lamp power Wla is higher, the gradient of the linear function expressing the relationship between the lamp voltage Vla and the discharge lamp temperature T is larger. Therefore, as the lamp power Wla is higher, the ratio of rise of the fan voltage Vf with respect to the lamp voltage Vla, i.e., the gradient of the linear function of the lamp voltage Vla and the discharge lamp temperature T is also larger. That is, the gradients of the linear functions of the control information CIa1, CIa2, CIa3 are larger in this order.

In the embodiment, the fan controller 200b selects the control information CIa in response to the lamp power Wla, and controls the fan F3 based on the control information CIa. In other words, the fan controller 200b controls the fan F3 based on the control information CIa and the lamp power Wla.

Figure 8:
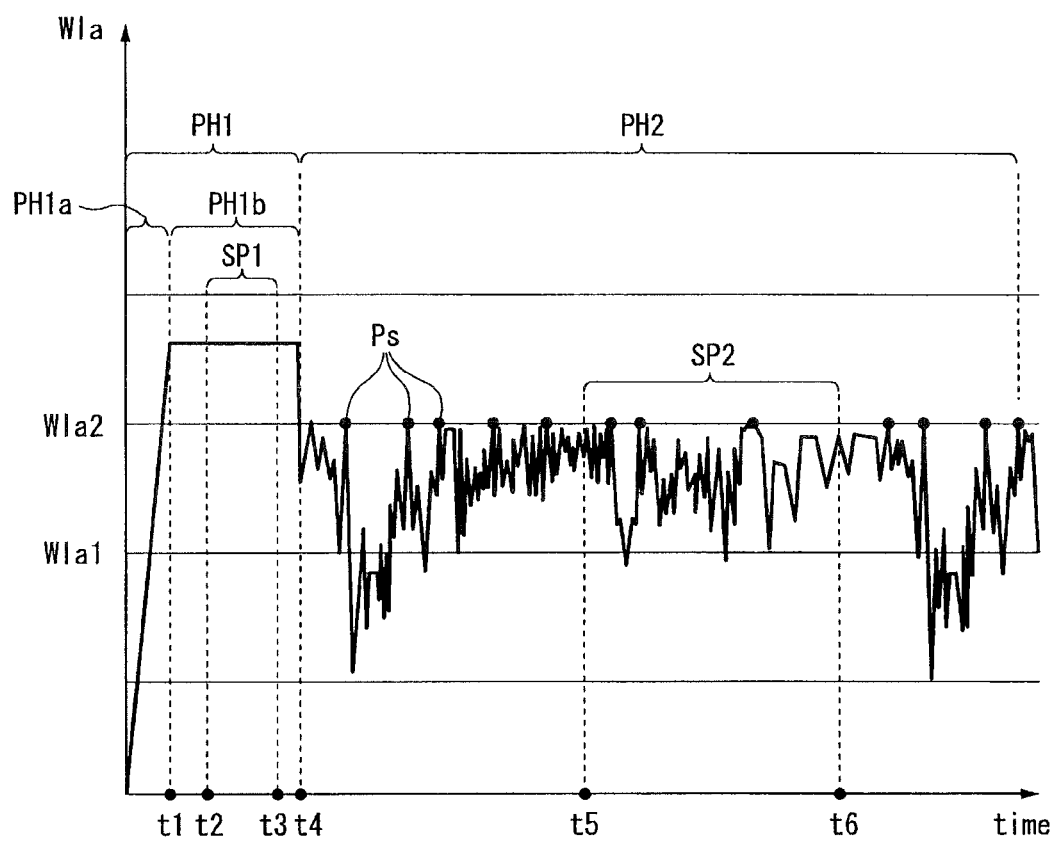
FIG. 8 shows an example of a lamp power waveform in the second embodiment.

FIG. 8 shows an example of a lamp power waveform in the embodiment. In FIG. 8, the horizontal axis indicates time and the vertical axis indicates the lamp power Wla.

As shown in FIG. 8, the lamp power waveform of the embodiment has a rising period PH1 and an adaptive dimming period PH2.

The rising period PH1 is a period from when lighting of the discharge lamp 90 is started to when the lamp power Wla becomes stable. The rising period PH1 has a first rising period PH1a in which the lamp power Wla gradually increases and a second rising period PH1b in which the lamp power Wla is constantly maintained to be Wla2.

The adaptive dimming period PH2 is a period in which the lamp power Wla is changed in response to a video signal input to the projector 1A. In the adaptive dimming period PH2, the upper limit of the lamp power Wla is set to Wla2.

First, the fan controller 200b detects the lamp power Wla and selects the appropriate control information CIa. Then, the fan controller 200b detects the lamp voltage Vla and determines the fan voltage Vf using the selected control information CIa. Thereby, the fan F3 is controlled by the fan controller 200b, and the discharge lamp temperature T may be maintained to be the proper temperature T3 in the proper cooling condition.

The fan controller 200b may control the fan voltage Vf over the entire period in which the projector 1A is lighted by constantly monitoring the lamp power Wla and the lamp voltage Vla, or may control the fan voltage Vf at fixed intervals by monitoring the lamp power Wla and the lamp voltage Vla only at predetermined times or in predetermined periods.

The predetermined time includes a time when the lamp power Wla takes a predetermined value (state Ps) in the adaptive dimming period PH2, for example. In FIG. 8, for example, the state Ps is a state in which the lamp power Wla is Wla2.

In this case, the fan controller 200b detects the lamp power Wla and the lamp voltage Vla and sets the fan voltage Vf in response to the control information CIa at each time when the lamp power Wla is Wla2 (state Ps).

Further, the predetermined period includes measurement periods SP1, SP2, for example.

The measurement period SP1 is a partial period of the second rising period PH1b in which the lamp power Wla is constant in the rising period PH1. In the example shown in FIG. 8, the measurement period SP1 is a period from time t2 to time t3 of the second rising period PH1b from time t1 to time t4.

In this case, the fan controller 200b detects the lamp power Wla and the lamp voltage Vla and sets the fan voltage Vf in response to the control information CIa in the measurement period SP1.

The measurement period SP2 is a partial period of the adaptive dimming period PH2. In the example shown in FIG. 8, the measurement period SP2 is a period from time t5 to time t6. The measurement period SP2 may be provided at fixed intervals or once at each time when the projector 1A is lighted in the adaptive dimming period PH2.

In this case, for example, average values of the lamp powers Wla and the lamp voltages Vla in the measurement period SP2 are calculated and the fan voltage Vf in response to the control information CIa is set using the average values.

According to the embodiment, the fan F3 is controlled based on the control information CIa in response to the lamp power Wla, and thereby, even when the lamp power Wla varies, the fan voltage Vf of the fan F3 may be adjusted so that the discharge lamp temperature T may be equal to or less than a fixed value, i.e., within a proper temperature range that has been initially set. Therefore, the discharge lamp 90 may be maintained in the proper cooling condition, and the life of the discharge lamp 90 may be improved.

Recently, many lighting methods of changing the lamp power Wla in use of projectors such as lighting modes with different lamp powers Wla including a low-power mode and a high-power mode and adaptive dimming of changing the lamp power Wla in response to the video signal and environmental illuminance have been proposed. The embodiment is particularly useful in the respective lighting methods of changing the lamp power Wla.

Note that, in the embodiment, the following configurations and methods may be employed.

In the embodiment, a relationship among the lamp power Wla, the lamp voltage Vla, and a degree of deterioration of the discharge lamp 90 may be obtained in advance and the fan controller 200b may obtain a deterioration condition of the discharge lamp 90 from the detected lamp power Wla and the lamp voltage Vla. In the configuration, the fan controller 200b sets the fan voltage Vf using the obtained deterioration condition of the discharge lamp 90 and the lamp power Wla.

Specifically, as shown in FIG. 7, when the detected lamp power Wla is Wla1 and the detected lamp voltage Vla is Vla4 (state P7), the degree of deterioration of the discharge lamp 90 is obtained, and thereby, the lamp voltage Vla when the lamp power Wla changes to Wla2, for example, may be obtained from the degree of deterioration. In the example of FIG. 7, for example, when the lamp power Wla changes to Wla2 at the degree of deterioration of the discharge lamp 90 in the state P7, the lamp voltage Vla becomes Vla6 (state P8). Accordingly, it is known that, when the lamp power Wla changes to Wla2, the fan voltage Vf is set to Vf6, and thereby, the discharge lamp temperature T may be maintained to be the proper temperature T3. The detection of the degree of deterioration of the discharge lamp 90 is performed at the above described time of the state Ps or in the measurement periods SP1, SP2, for example.

According to the configuration, after the degree of deterioration of the discharge lamp 90 is detected, the fan voltage Vf may be determined only by detection of the lamp power Wla, and the control may be simple and easy.

Further, in the embodiment, like in the first embodiment, the control information CIa may include information representing a relationship between the fan voltage Vf and a difference between the temperature of the top part 510a of the discharge lamp 90 and the temperature of the bottom part 510b of the discharge lamp 90 (temperature information of the discharge lamp), information representing a relationship between a temperature distribution of the discharge lamp 90 and the fan voltage Vf, and information representing a relationship between the temperature of the top part 510a of the discharge lamp 90 and the fan voltage Vf.

Furthermore, in the embodiment, like in the first embodiment, an adjuster that may adjust the blow of the air (cooling wind) to the light source unit 50 (mainly, the discharge lamp 90) may be provided in the fan F3.

Moreover, in the embodiment, like in the first embodiment, the fan voltage Vf may be set to a constant voltage and PWM (Pulse Width Modulation) control may be performed, and thereby, the rotation speed of the fan F3 may be changed.

In addition, in the embodiment, like in the first embodiment, the fan F4 may be controlled in conjunction with the fan F3.

Working Examples of First Embodiment

As below, working examples of the first embodiment will be explained.

First, the relationships between the temperature of the discharge lamp and the lamp voltage Vla with respect to each fan voltage Vf in the working examples were experimentally measured. For the discharge lamp, a high-pressure mercury lamp 90a having normal rated power of 230 W was used. The initial lamp voltage Vla of the high-pressure mercury lamp 90a was about 66 V. Further, for the fan for cooling the high-pressure mercury lamp 90a, a sirocco fan having output of 1 W was used.

For the temperature of the discharge lamp, a discharge lamp temperature Ta of the top part 510a (hottest part) of the high-pressure mercury lamp 90a was used and changes in discharge lamp temperature Ta with respect to the changes in lamp voltage Vla were measured in the respective cases where the fan voltage Vf is set to 6.5 V, 6.75 V, 7 V, 7.25 V, and 7.5 V.

First, the high-pressure mercury lamp 90a and the fan were driven, the discharge lamp temperature Ta when the lamp voltage Vla is the initial voltage 66 V was measured, and then, the discharge lamp temperatures Ta when the lamp voltage Vla rises to 70 V, 75 V, 80 V, 85 V, and 90 V were respectively measured. For the measurement of the discharge lamp temperatures Ta, infrared thermography was used.

Figure 9:
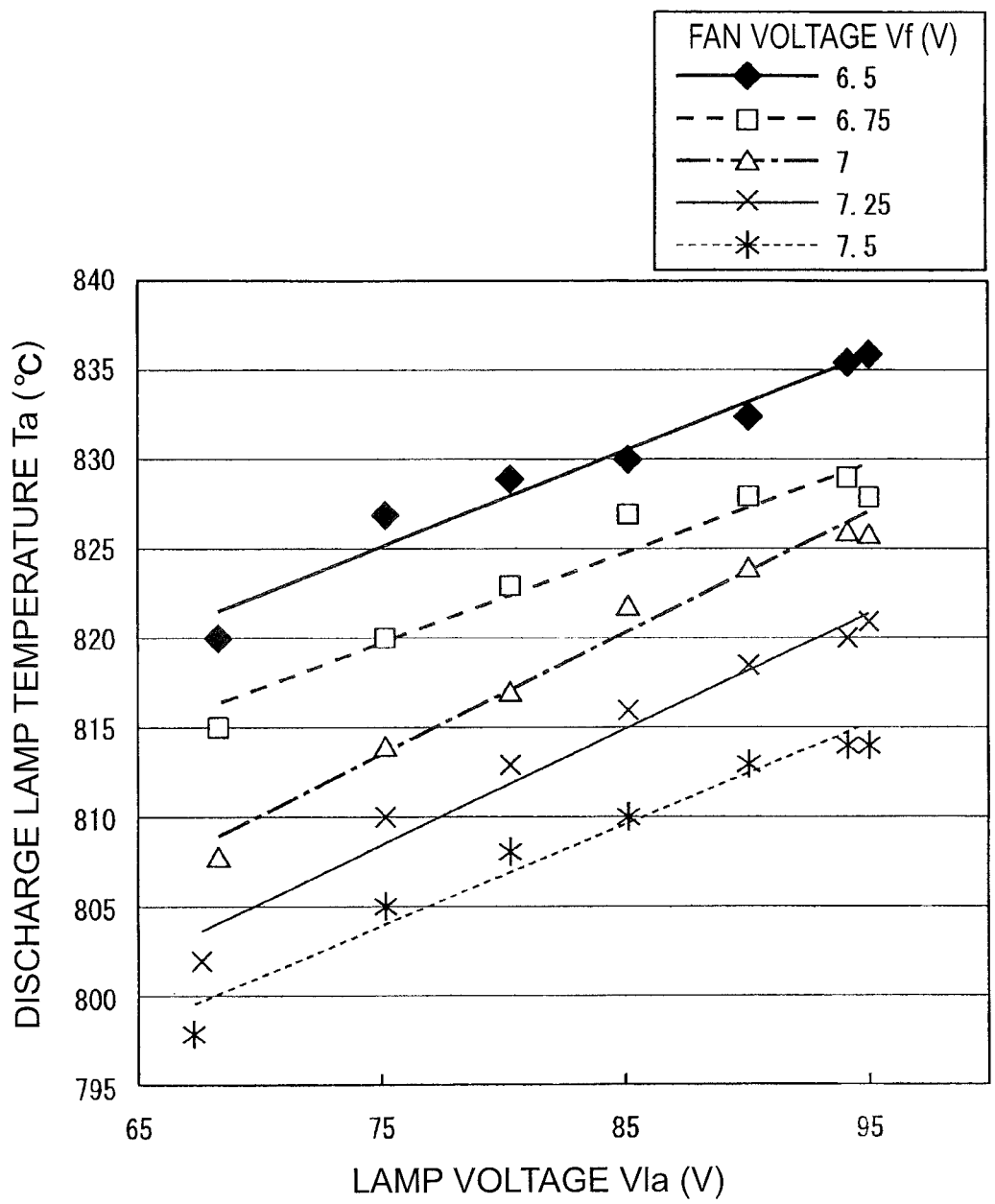
FIG. 9 is a graph showing relationships among a discharge lamp temperature, a lamp voltage, and a fan voltage in working examples of the first embodiment.

FIG. 9 is a graph showing the measurement results. The horizontal axis indicates the lamp voltage Vla and the vertical axis indicates the discharge lamp temperature Ta.

As shown in FIG. 9, linear-functional correlations were recognized between the lamp voltage Vla and the discharge lamp temperature Ta with respect to all of the respective fan voltages Vf.

Therefore, it was confirmed that the temperature of the discharge lamp rises according to a linear function with rise of the lamp voltage.

Figure 10:
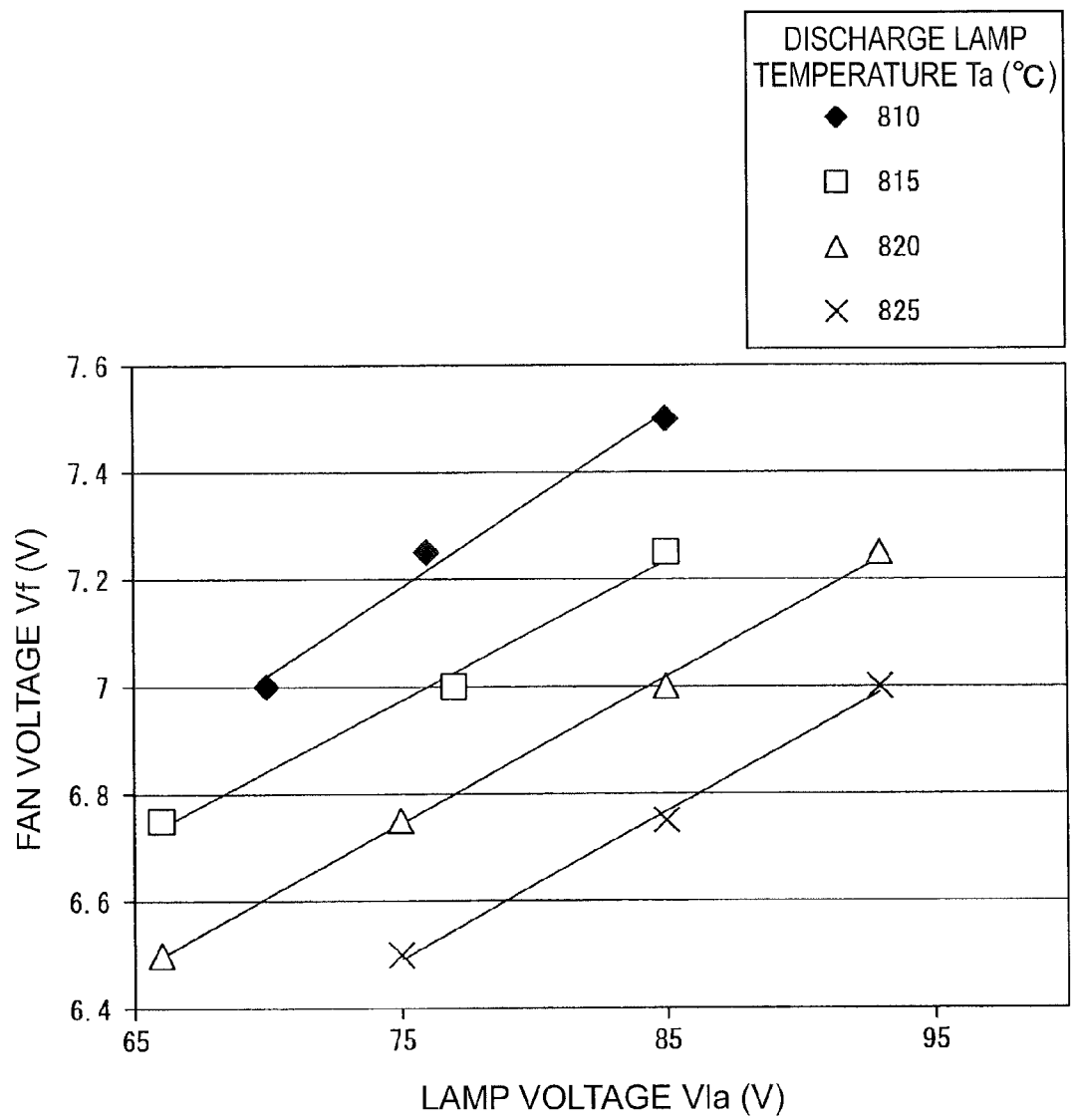
FIG. 10 is a graph showing control information in the working examples of the first embodiment.

Further, relationships between the lamp voltage Vla and the fan voltage Vf, i.e., control information for control of the fan voltage Vf were obtained based on the measurement results. FIG. 10 shows the results. From FIG. 10, it was confirmed that the fan voltage Vf is a linear function with the lamp voltage Vla as a variable.

Then, times until devitrification occurs in the high-pressure mercury lamp 90a were measured with respect to the cases of working example 1 to working example 3 in which control of the fan is performed and comparative example 1 in which control of the fan is not performed as in related art, that is, the fan voltage Vf is not changed from an initially set value. The occurrences of devitrification were visually observed.

The control of the fan was performed using the control information measured by the above described experiments and the lamp voltage Vla was detected at a sampling rate of ten times per second. Further, the initial value of the fan voltage Vf was set to 6.5 V and the discharge lamp temperature Ta in this case was 820° C.

Working example 1 is the case where the fan voltage Vf is controlled so that the discharge lamp temperature Ta may be maintained at 820° C. Specifically, the fan voltage Vf was controlled according to the graph of the linear function when the discharge lamp temperature Ta is 820° C. as shown in FIG. 10. In other words, the fan voltage Vf was controlled so that the rotation speed of the fan may be a linear function with the lamp voltage Vla as a variable. Under the control, an error of the discharge lamp temperature Ta with respect to 820° C. was ±5° C. Note that 820° C. is a value of the discharge lamp temperature Ta in the proper cooling condition in the working example.

Working example 2 is the case where the fan voltage Vf is controlled so that the lamp voltage Vla may take a predetermined value in a predetermined range. That is, the fan voltage Vf is changed at multiple steps in response to the range of the value of the lamp voltage Vla.

In the working example, two-step control of controlling the fan at the time when the fan controller detects that the lamp voltage Vla of the high-pressure mercury lamp 90a exceeds 90 V and changing the fan voltage Vf only once so that the discharge lamp temperature Ta may be 820° C.

More specifically, the fan voltage Vf was maintained at 6.5 V without change as the initial value in a range of the lamp voltage Vla from 66 V to 90 V, and the fan voltage Vf was controlled so that the fan voltage Vf may be 7.15 V in a range higher than 90 V.

Working example 3 is the case where a throttle mechanism (adjuster) is provided in the air exhaust port of the fan and the fan voltage Vf and the degree of opening of the throttle mechanism are controlled so that a temperature distribution of the outer surface at the top part 510a side of the high-pressure mercury lamp 90a may be constant. Specifically, information on the temperature distribution of the outer surface at the top part 510a side of the high-pressure mercury lamp 90a was added to the control information, the fan voltage Vf and the throttle mechanism were controlled based on the control information, and the rotation speed of the fan, the blowing position and the blowing region of the cooling wind of the fan with respect to the high-pressure mercury lamp 90a were adjusted.

Comparative example 1 is the case where the fan voltage Vf is unchanged and left to be the value in the initial state as in related art.

Table 1 shows the measurement results of working example 1 to working example 3 and comparative example 1.

TABLE 1

|  | Time until devitrification is recognized (h) |
|---|---|
| Working example 1 | 3500 |
| Working example 2 | 3000 |
| Working example 3 | 3700 |
| Comparative example 1 | 1000 |

From Table 1, it is known that the times until devitrification is recognized are three or more times longer in all of working example 1 to working example 3 than that in comparative example 1. Accordingly, it has been confirmed that the life of the discharge lamp may be improved by control of the fan voltage in response to the changes in lamp voltage.

Further, working example 2 is the multistep control (two-step control), and may control the cooling condition of the discharge lamp by having a simple control table. Accordingly, the life of the discharge lamp may be improved while the control method may be made simple and easy.

Note that, in working example 2, the two-step control of changing the fan voltage Vf only once is employed, however, multistep control including more than two steps may be employed. In this case, the life improvement effect of the discharge lamp between working example 1 and working example 2 shown in the working example may be obtained.

Furthermore, in comparison between working example 1 and working example 3, the time until devitrification is recognized is 3500 h in working example 1 and 3700 h in working example 3. That is, it is known that the time until devitrification is recognized is longer in working example 3 than in working example 1. Accordingly, it has been confirmed that the life of the discharge lamp may be further improved in the case of control of the fan voltage Vf and the degree of opening of the throttle mechanism than in the case of control of the fan voltage Vf only.

FIGS. 11A to 11E are plan views showing changes in temperature distribution of the outer surface at the top part 510a side of the high-pressure mercury lamp 90a in comparative example 1.

FIGS. 12A and 12B are plan views showing changes in temperature distribution of the outer surface at the top part 510a side of the high-pressure mercury lamp 90a in working example 3.

FIGS. 11A and 12A show temperature distributions in the initial state of the high-pressure mercury lamp 90a, and FIGS. 11E and 12B show temperature distributions after 2000 hours from lighting of the high-pressure mercury lamp 90a. The temperature distributions were measured using infrared thermography.

As shown in FIGS. 11A to 11E, in comparative example 1 in which the fan voltage Vf is unchanged in the initial state, the temperature of the top part 510a of the high-pressure mercury lamp 90a rises with the rise of the lamp voltage Vla. Then, with the rise of the temperature of the top part 510a of the high-pressure mercury lamp 90a, the temperature of the part surrounding the top part 510a also rises and the temperature deviation on the outer surface at the top part 510a side of the high-pressure mercury lamp 90a becomes larger.

In working example 3 compared to comparative example 1, as shown in FIGS. 12A and 12B, it is known that the temperature distribution of the high-pressure mercury lamp 90a is hardly changed from the temperature distribution in the initial state.

Figure 13:
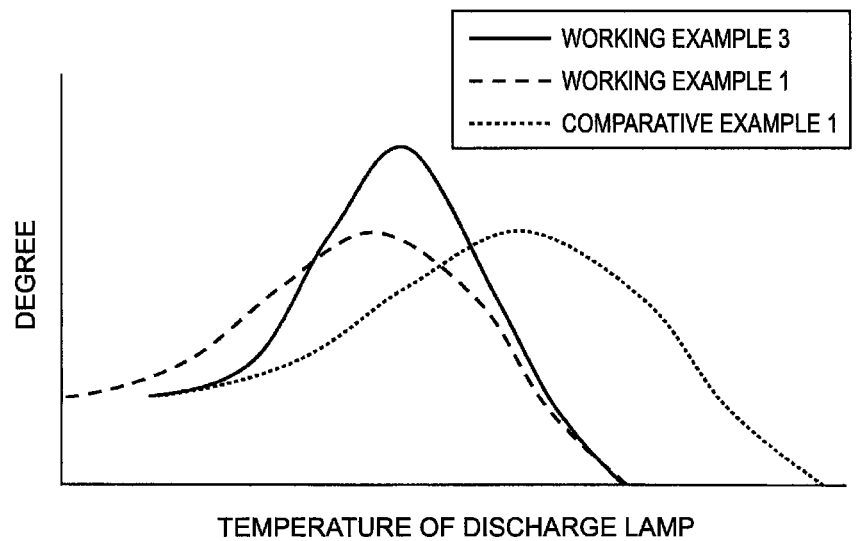
FIG. 13 is a graph showing temperature distribution of the discharge lamps in the working examples of the first embodiment.

FIG. 13 is a graph showing degree distributions of the temperatures of working example 3, working example 1, and comparative example 1 after 2000 hours from lighting of the high-pressure mercury lamp 90a. The horizontal axis indicates the discharge lamp temperature, i.e., the temperature of the high-pressure mercury lamp 90a and the vertical axis indicates the degree with respect to each temperature. The degree distributions were calculated from the temperature distributions detected by infrared thermography.

As shown in FIG. 13, it is known that the temperature of the high-pressure mercury lamp 90a is lower as a whole in working example 1 and working example 3 than that in comparative example 1. Further, it is known that temperature variations in the high-pressure mercury lamp 90a are smaller and the temperature deviation is smaller in working example 3 than those in working example 1 and comparative example 1.

It is considered that, in comparative example 1, the temperature of the high-pressure mercury lamp 90a rises as a whole with the rise of the lamp voltage Vla because control of the fan voltage Vf is not performed.

In working example 1, the discharge lamp temperature Ta of the top part 510a of the high-pressure mercury lamp 90a is maintained to be constant because the control of the fan voltage Vf is performed. However, the air is blown to the whole high-pressure mercury lamp 90a by the fan, and it is considered that the part surrounding the top part 510a of the high-pressure mercury lamp 90a is cooled compared to that in the initial state and the temperature deviation becomes larger.

In comparison, in working example 3, the air blow of the fan is adjusted by the throttle and, for example, cooling of the top part 510a of the high-pressure mercury lamp 90a as the hottest part may be concentrated. It is considered that, thereby, cooling of the part surrounding the top part 510a more than necessary may be suppressed while the discharge lamp temperature Ta of the top part 510a of the high-pressure mercury lamp 90a may be maintained to be constant, and the temperature deviation may be made smaller, in other words, the temperature distribution may be maintained to be the same as that in the initial proper cooling condition.

As described above, it has been confirmed that the method of blowing the air by the fan is controlled in response to the temperature distribution of the discharge lamp, and thereby, the proper temperature distribution of the discharge lamp may be maintained and the life of the discharge lamp may be improved.

Working Examples of Second Embodiment

As below, working examples of the second embodiment will be explained.

Like the working examples of the first embodiment explained as above, the relationships between the temperature of the discharge lamp with respect to each fan voltage Vf and the lamp voltage Vla were experimentally measured in the respective cases where the lamp power Wla is 200 w, 170 w, and 140 w. For the discharge lamp, a high-pressure mercury lamp having normal rated power of 230 W was used. The initial lamp voltage Vla of the high-pressure mercury lamp was about 66 V. Further, for the fan for cooling the high-pressure mercury lamp, a sirocco fan having output of 1 W was used.

Figure 14:
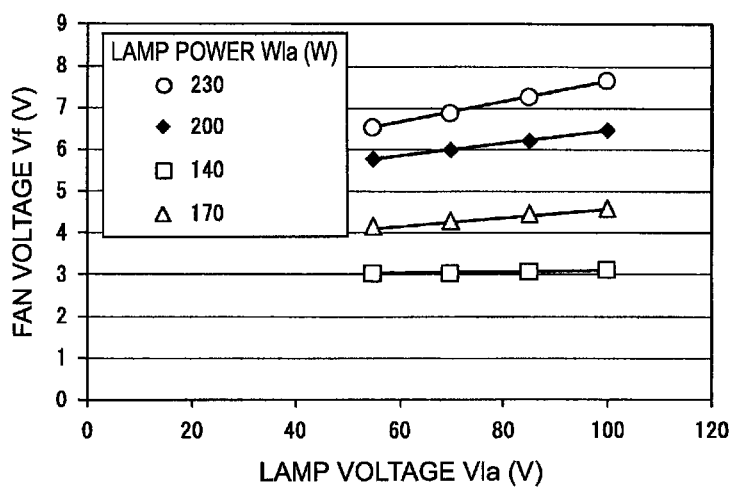
FIG. 14 is a graph showing control information in working examples of the second embodiment.
Figure 15:
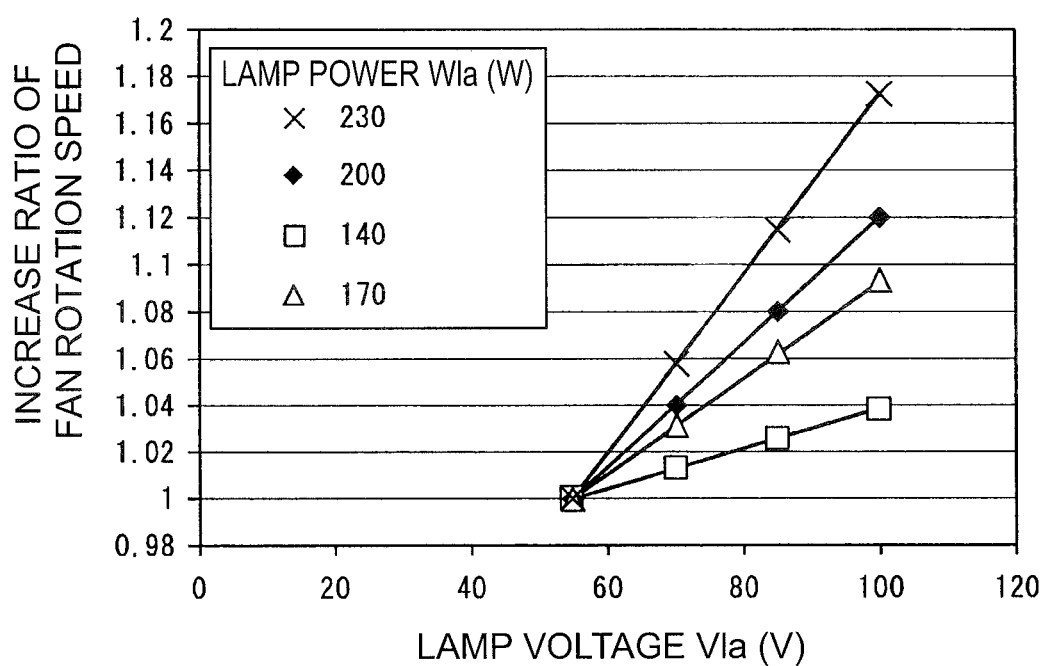
FIG. 15 is a graph showing control information in the working examples of the second embodiment.

The relationships between the lamp voltage Vla and the fan voltage Vf, i.e., control information for controlling the fan voltage Vf were obtained based on the measurement results. FIGS. 14 and 15 show the results. FIGS. 14 and 15 show control information when the discharge lamp temperature is maintained to be 810° C. In FIG. 14, the horizontal axis indicates the lamp voltage Vla (V) and the vertical axis indicates the fan voltage Vf (V). In FIG. 15, the horizontal axis indicates the lamp voltage Vla (V) and the vertical axis indicates an increase ratio of fan rotation speed. The increase ratio of fan rotation speed is a ratio to the rotation speed of the fan when the lamp voltage Vla is 55 V.

From FIGS. 14 and 15, it has been confirmed that, as the lamp power Wla is higher, the gradient of the linear function of the control information is larger.

The entire disclosure of Japanese Patent Application No.: 2013-129335, filed Jun. 20, 2013 and 2014-068224, filed Mar. 28, 2014 are expressly incorporated by reference herein.

What is claimed is:

1. A light source comprising:
   a discharge lamp that outputs light;
   a discharge lamp driver that supplies drive power to the discharge lamp;
   a cooling unit that cools the discharge lamp; and
   a control unit that controls the cooling unit,
   wherein the control unit controls the cooling unit based on both control information representing a relationship between a rotation speed of the cooling unit and a voltage between electrodes of the discharge lamp and a detected voltage between the electrodes of the discharge lamp.

2. The light source according to claim 1, wherein the rotation speed of the cooling unit is a linear function with the voltage between electrodes of the discharge lamp as a variable.

3. The light source according to claim 1, wherein the control unit further controls at least one of a blowing position and a blowing region of cooling wind from the cooling unit based on the control information.

4. The light source according to claim 1, wherein the rotation speed of the cooling unit takes a value determined with respect to a predetermined range of the voltage between electrodes of the discharge lamp.

5. The light source according to claim 1, wherein the control unit controls the cooling unit based on the control information and information of the drive power.

6. A projector comprising:
   the light source according to claim 1;
   a light modulation device that modulates the light output from the light source in response to a video signal; and
   a projection system that projects the light modulated by the light modulation device.

7. A method of cooling a discharge lamp using a cooling unit comprising:
   controlling the cooling unit based on both control information representing a relationship between a rotation speed of the cooling unit and a voltage between electrodes of the discharge lamp and a detected voltage between the electrodes of the discharge lamp.

8. The light source according to claim 1, further comprising an adjuster that adjusts the air flow from the cooling unit that is blown to the discharge lamp in response to a temperature distribution of the discharge lamp.

9. The light source according to claim 1, wherein
   the control unit increases the rotation speed of the cooling unit when the voltage between the electrodes of the discharge lamp increases, and
   the control unit decreases the rotation speed of the cooling unit when the voltage between the electrodes of the discharge lamp decreases.

10. The light source according to claim 1, wherein the rotation speed of the cooling unit and the voltage between the electrodes of the discharge lamp included in the control information are related so as to maintain temperature of the discharge lamp to a proper temperature.

11. A projector comprising:
the light source according to claim 2;
a light modulation device that modulates the light output from the light source in response to a video signal; and
a projection system that projects the light modulated by the light modulation device.

12. A projector comprising:
the light source according to claim 3;
a light modulation device that modulates the light output from the light source in response to a video signal; and
a projection system that projects the light modulated by the light modulation device.

13. A projector comprising:
the light source according to claim 4;
a light modulation device that modulates the light output from the light source in response to a video signal; and
a projection system that projects the light modulated by the light modulation device.

14. A projector comprising:
the light source according to claim 5;
a light modulation device that modulates the light output from the light source in response to a video signal; and
a projection system that projects the light modulated by the light modulation device.

15. A projector comprising:
the light source according to claim 8;
a light modulation device that modulates the light output from the light source in response to a video signal; and
a projection system that projects the light modulated by the light modulation device.

16. A projector comprising:
the light source according to claim 9;
a light modulation device that modulates the light output from the light source in response to a video signal; and
a projection system that projects the light modulated by the light modulation device.

17. A projector comprising:
the light source according to claim 10;
a light modulation device that modulates the light output from the light source in response to a video signal; and
a projection system that projects the light modulated by the light modulation device.

* * * * *